United States Patent [19]

Kuromitsu et al.

[11] Patent Number: 5,704,587
[45] Date of Patent: Jan. 6, 1998

[54] ELECTROMAGNETIC VALVE DEVICE

[75] Inventors: Hiromu Kuromitsu, Chiryu; Hideharu Hironaka, Kariya, both of Japan

[73] Assignee: Aisin Seiki Kabushiki Kaisha, Kariya, Japan

[21] Appl. No.: 511,195

[22] Filed: Aug. 4, 1995

[30] Foreign Application Priority Data

Aug. 5, 1994 [JP] Japan ................................. 6-184300
Mar. 17, 1995 [JP] Japan ................................. 7-058814
Jun. 16, 1995 [JP] Japan ................................. 7-150591

[51] Int. Cl.$^6$ ................................................. F16K 31/06
[52] U.S. Cl. ...................... 251/129.15; 251/39; 303/119.2
[58] Field of Search ........................... 251/39, 129.01, 251/129.15; 303/119.2

[56] References Cited

U.S. PATENT DOCUMENTS 5,425,575  6/1995  Schmidt et al. ........................ 303/119.2

FOREIGN PATENT DOCUMENTS 42 36 482  5/1994  Germany.
6-213364   8/1994  Japan.

*Primary Examiner*—Kevin Lee
*Attorney, Agent, or Firm*—Burns, Doane, Swecker & Mathis, LLP

[57] ABSTRACT

An electromagnetic valve device includes a valve body having a first fluid chamber, and inlet and outlet passages fluidly communicating with the first fluid chamber. In a first fluid chamber, a first movable member is slidably received within a stationary sleeve to define a second fluid chamber within the sleeve. The second fluid chamber is in continuous fluid communication with the first fluid chamber and is in fluid communication with the inlet passage. The first member has a first valve for selectively interrupting fluid communication between the inlet passage and the first fluid chamber, and is urged by a return spring into a first position to effect fluid communication between the first fluid chamber and the inlet passage. A second movable member operatively connected to an electromagnet has a second valve for selectively interrupting the fluid communication between the inlet passage and the second fluid chamber. The second member is urged by a return spring into a non-energized position in which fluid communication between the second fluid chamber and the inlet fluid passage is interrupted when the first member is positioned in the first position. When the electromagnet is energized, the second member moves to an energized position and the first member is moved by the second member into a second position to interrupt fluid communication between the inlet passage and the first fluid chamber. A pressure differential between the inlet and outlet passages greater than a predetermined pressure differential holds the first member in the second position so that restricted fluid communication occurs between the inlet and outlet passages when the electromagnet is de-energized.

11 Claims, 5 Drawing Sheets

ELECTROMAGNETIC VALVE DEVICE

FIELD OF THE INVENTION

The present invention relates to a valve device, and more particularly to an electromagnetic valve device which is used as a brake pressure regulating valve in an anti-lock brake system.

BACKGROUND OF THE INVENTION

An electromagnetic valve device used in an anti-lock brake system, must be capable of reducing the flow rate of fluid supplied from a brake master cylinder to at least one wheel brake cylinder during anti-lock control operation relative to that of the fluid supplied from the brake master cylinder to the wheel brake cylinder to attain high response during normal braking operation and low noise characteristics during anti-lock control operation. A conventional electromagnetic valve device having low noise characteristics is disclosed in Japanese Patent Laid-Open Publication No. Hei 6 (1994)-213364. This conventional device has a first valve member for controlling restricted fluid communication between inlet and outlet passages provided within a valve body, and a second valve member slidably received within the first valve member for controlling non-restricted fluid communication between the inlet and outlet passages. The second valve member is urged by a return spring into a first position in which the inlet and outlet fluid passages are in the non-restricted fluid communication, and the first valve member is urged by a return spring interposed between the first and second valve members into a first position in which the inlet and outlet fluid passages are in the restricted fluid communication. When an electromagnet connected to the first valve member is energized with a first amount of current, the first valve member is moved from a first position into a second position in which the inlet and outlet fluid passages remain in the restricted fluid communication, while the second valve member is moved by the spring from the first position into a second position in which the non-restricted fluid communication between the inlet and outlet fluid passages is interrupted. When the electromagnet is energized with a second amount of current, the first valve member is moved from the second position into a third position in which the restricted fluid communication between the inlet and outlet fluid passages is interrupted. The restricted fluid communication between the inlet and outlet fluid passages is re-established by changing the current applied to the electromagnet from the second amount to the first amount. Since fluid flowing from the inlet to the outlet is restricted, the noise associated with the fluid flow is relatively low.

However, such a conventional device requires a controller for changing the current supplied to the electromagnet in three steps, thereby increasing the manufacturing cost of the anti-lock brake system.

SUMMARY OF THE INVENTION

A need exists therefore, for an electromagnetic valve device which is capable of operating in the required manner without increasing the manufacturing cost.

A need also exists for an electromagnetic valve device whose operation is highly reliable.

In light of the foregoing, the present invention provides an electromagnetic valve that includes a valve body having a first fluid chamber and inlet and outlet passages therein, the inlet and outlet passages being in fluid communication with the first fluid chamber. An electromagnet device is fixed to the valve body, and a sleeve member positioned in the first fluid chamber is fixed with respect to the valve body at one end thereof. A first movable member is sealingly and slidably received within an interior of the sleeve member to define a second fluid chamber within the sleeve member. The first movable member has a first valve portion positioned in the first fluid chamber for selectively interrupting the fluid communication between the first fluid chamber and the inlet fluid passage. The first movable member is urged by a first return spring into a first position in which fluid communication between the first fluid chamber and the inlet fluid passage is established, the second fluid chamber being in continuous fluid communication with the first fluid chamber through an orifice and being in fluid communication with the inlet fluid passage through an additional fluid passage provided within the first movable member. A second movable member is operatively connected to the electromagnet device and has a second valve portion positioned in the second chamber for selectively interrupting fluid communication between the second fluid chamber and the inlet fluid passage. The second movable member is urged by a second return spring into a non-energized position in which fluid communication between the second fluid chamber and the inlet fluid passage is interrupted when the first movable member is positioned in the first position. The second movable member is moved by the electromagnet device from the non-energized position into an energized position in which fluid communication between the second fluid chamber and the inlet fluid passage is interrupted. The movement of the second movable member causes the first movable member to move from the first position into a second position in which fluid communication between the first fluid chamber and the inlet fluid passage is interrupted. An arrangement is provided for holding the first movable member in the second position against the first return spring by a fluid pressure differential between the inlet and outlet passages that is larger than a predetermined fluid pressure differential.

According to another aspect of the invention, an electromagnetic valve device includes a valve body provided with a first fluid chamber, an inlet passage, and an outlet passage, with the inlet and outlet passages being in fluid communication with the first fluid chamber, an electromagnet device fixed to the valve body, a sleeve member positioned in the first fluid chamber and fixed to the valve body, a first movable member and a second movable member. The first movable member is slidably positioned within the interior of the sleeve member to define a second fluid chamber within the sleeve member. The first movable member has a first valve portion positioned in the first fluid chamber for selectively establishing and interrupting unrestricted fluid communication between the first fluid chamber and the inlet fluid passage. A first return spring is provided for urging the first movable member in a first direction towards a first position to establish unrestricted fluid communication between the first fluid chamber and the inlet fluid passage. The second fluid chamber is in continuous fluid communication with the first fluid chamber through an orifice and is in fluid communication with the inlet fluid passage through an additional fluid passage provided within the first movable member. The second movable member is operatively connected to the electromagnet device and has a second valve portion positioned in the second chamber for selectively establishing and interrupting fluid communication between the second fluid chamber and the inlet fluid passage. A second return spring urges the second movable member to a non-energized position in which fluid communication between the second fluid chamber and the inlet fluid passage is established through the additional passage when the first movable member is positioned in the first position. The second movable member is movable by the electromagnet device from the non-energized position to an energized position in which fluid communication between the second fluid chamber and the inlet fluid passage is interrupted, with the movement of the second movable member to the energized position causing the first movable member to move from the first position to a second position in which unrestricted fluid communication between the first fluid chamber and the inlet fluid passage is interrupted. In addition, the valve device is constructed to provide a fluid pressure force against the first movable member sufficient to maintain the first movable member in the second position when the second movable member is in the non-energized position until a pressure differential between the pressure at the outlet fluid passage and the pressure at the inlet fluid passage is less than a predetermined value.

BRIEF DESCRIPTION OF THE DRAWING FIGURES

The above and other features of the present invention will be more apparent and more readily appreciated from the following detailed description considered in connection with the accompanying drawing figures in which like elements bear like reference numerals and wherein.

DETAILED DESCRIPTION OF PREFERRED EMBODIMENTS

Preferred embodiments of the present invention will be described in detail hereinafter with reference to the accompanying drawing figures.

Figure 1:
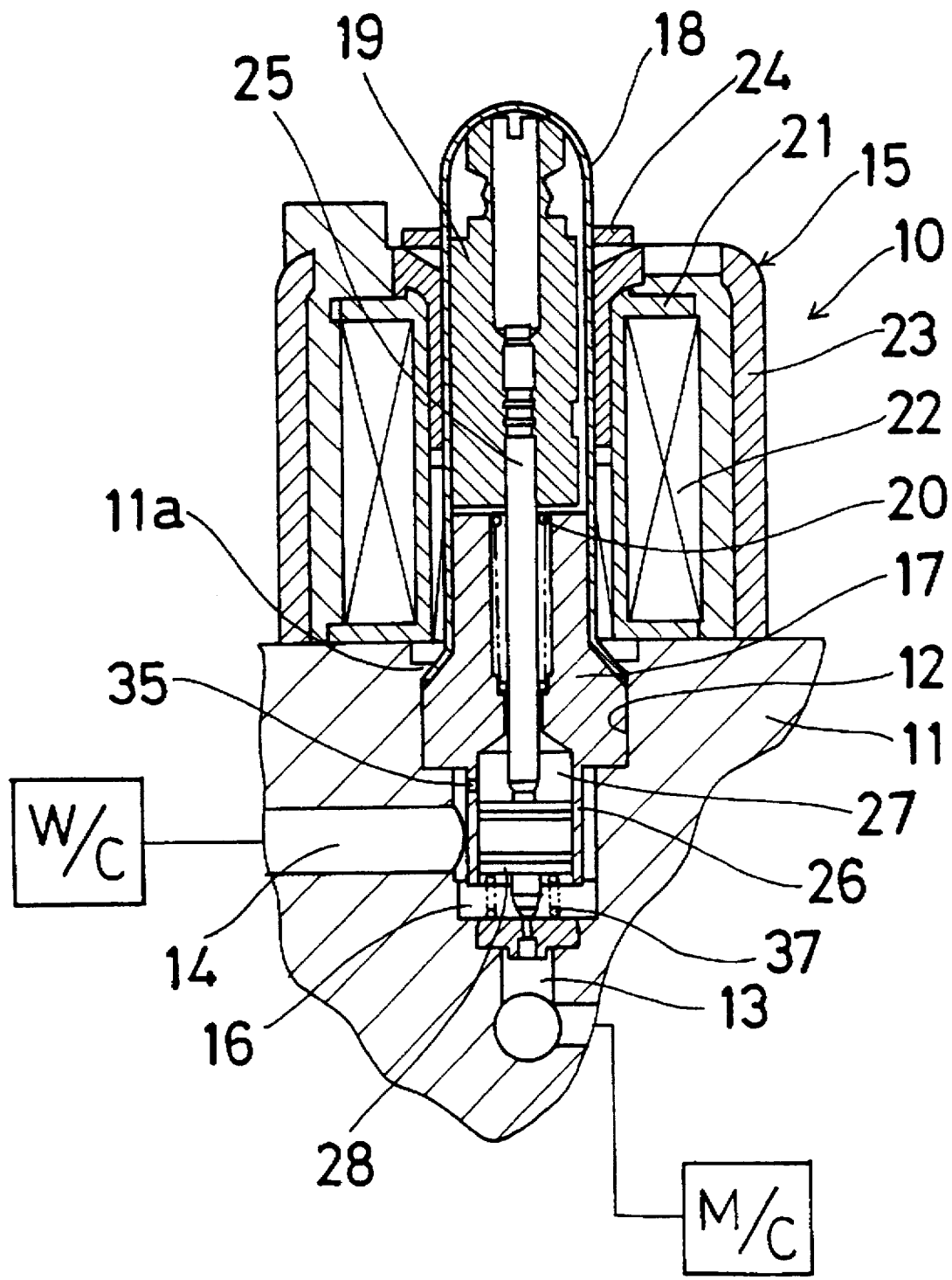
FIG. 1 is a cross-sectional view of a first embodiment of an electromagnetic valve in accordance with the present invention.
Figure 2:
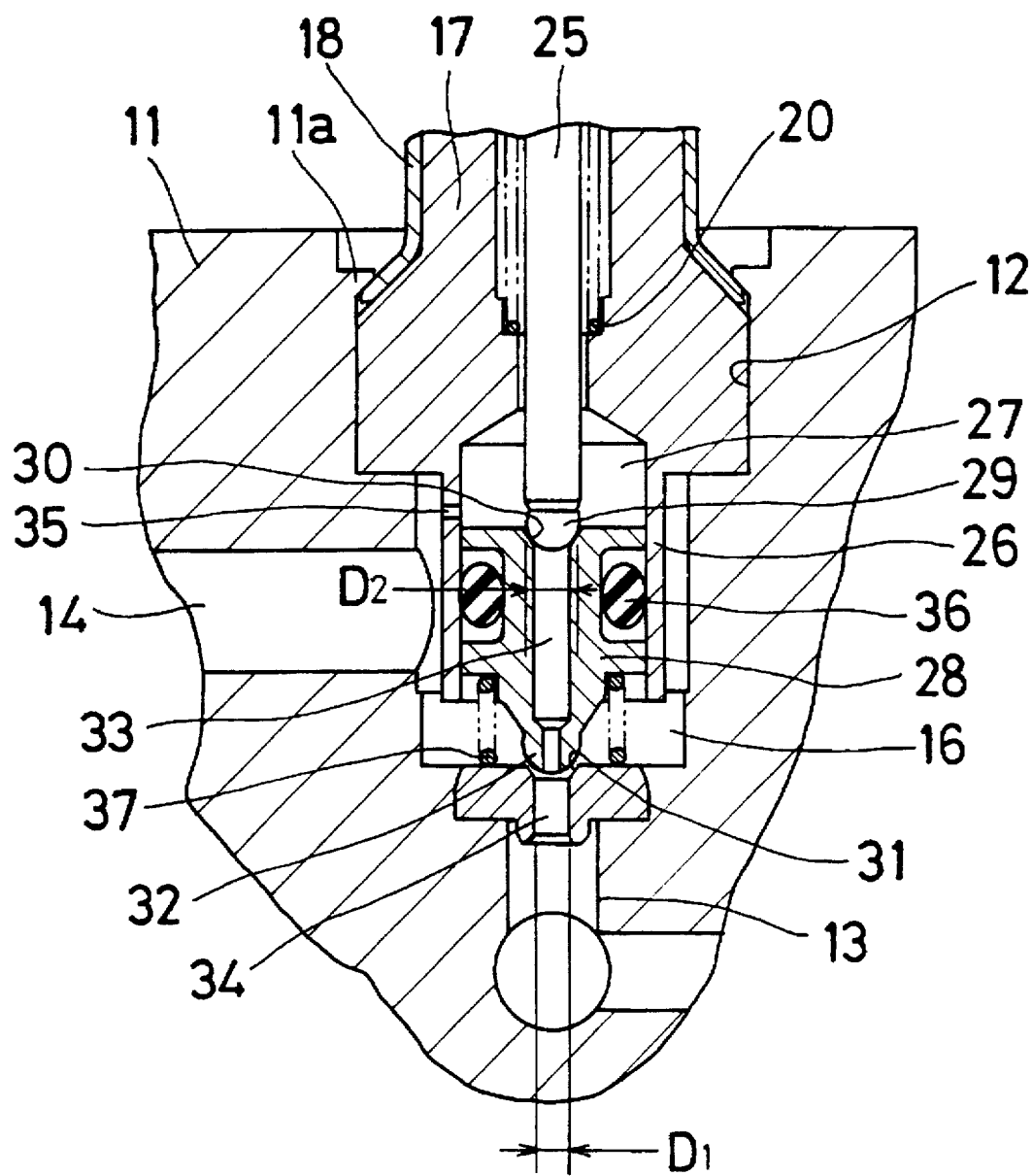
FIG. 2 is an enlarged cross-sectional view of a portion of the electromagnetic valve shown in FIG. 1.

Referring initially to FIGS. 1 and 2, the electromagnetic valve 10 includes a valve body 11 made of magnetic material and an electromagnet 15. The valve body 11 is provided with a stepped bore 12, an inlet fluid passage 13 and an outlet fluid passage 14. The inlet fluid passage 13 is in fluid communication with a brake master cylinder M/C and the outlet passage 14 is in fluid communication with a wheel brake cylinder W/C.

The electromagnet 15 includes a stationary core 17 made of magnetic material, a sleeve 18 made of non-magnetic material, a movable plunger 19 made of magnetic material, a return spring 20, an electric coil 22 wound on a bobbin 21 made of nonmagnetic material, and a yoke 23 made of magnetic material. The core 17 is inserted into the upper end portion of the stepped bore 12 to define a first fluid chamber 16 within the valve body 11. The first fluid chamber 16 is in fluid communication at a bottom thereof with the first fluid passage 13 and is in fluid communication at a peripheral portion thereof with the second fluid passage 14.

The lower portion of the sleeve 18 receives therein an upper reduced diameter portion of the core 17. The valve body 11 is provided with a deformed portion 11a for sealingly fixing the core 17 and the sleeve 18 to the valve body 11. The movable plunger 19 is slidably received within the sleeve 18 and is urged upwards by a return spring 20. A retainer 24 is provided for fixing the yoke 23 and the bobbin 21.

As best seen in FIG. 2, a sleeve member 26 positioned within the first fluid chamber 16 is integrally connected at an upper end thereof to the core 17. A first movable member 28 is sealingly and slidably received within the sleeve member 26 to define a second fluid chamber 27 within the sleeve 26. The first movable member 28 is provided with an annular groove on an outer periphery thereof for receiving an annular sealing member 36 made of rubber. The second fluid chamber 27 is disposed above the first fluid chamber 16 in the orientation of the valve shown in FIG. 2. The second fluid chamber 27 is in restricted fluid communication with the first fluid chamber 16 through an orifice 35 provided in the sleeve member 26. The second fluid chamber 27 is also in fluid communication with the first fluid chamber 16 through a passage 33 provided within the first movable member 28. A passage 34 extends between the first fluid chamber 16 and the inlet fluid passage 13.

The lower end of the first movable member 28 is provided with a first valve portion 32 for selectively interrupting fluid communication between the first fluid chamber 16 and the inlet fluid passage 13. A second movable member 25 slidably penetrates the core 17 and is connected at its upper end portion to the movable plunger 19. The lower end of the second movable member 25 is provided with a valve portion 29 positioned within the second fluid chamber 27 for selectively interrupting fluid communication between the second fluid chamber 27 and the inlet fluid passage 13.

The second movable member 25 is urged by the return spring 20 into a non-energized position which is shown in FIG. 2. In the non-energized position, the upper end of the movable plunger 19 abuts the top of the sleeve 18. A return spring 37 is interposed between the bottom of the first fluid chamber 16 and the lower end of the first movable member 28. This return spring 37 urges the first movable member 28 into a first position shown in FIG. 2 in which the second valve portion 29 of the second movable member 25 positioned in the non-energized position abuts a valve seat portion 30 provided on the upper end of the first movable member 28 to interrupt fluid communication between the second fluid chamber 27 and the fluid passage 33 and in which the first valve portion 32 is spaced apart from a valve seat portion 31 provided on the bottom of the first fluid chamber 16 to establish fluid communication between the first fluid chamber 16 and the inlet fluid passage 13.

When the electromagnet 15 is energized, the movable plunger 19 moves downward in FIG. 2 so that the second movable member 25 is moved by the plunger 19 from the non-energized position into an energized position. At the same time, the first movable member 28 is moved by the second movable member 25 from the first position into a second position in which the second valve portion 29 remains in sealing engagement with the valve seat portion 30 and the first valve portion 32 sealingly engages the valve seat portion 31 to interrupt fluid communication between the first fluid chamber 16 and the inlet fluid passage 13, whereby fluid communication between the inlet passage 13 and the outlet passage 14 is interrupted.

The valve seat portion 30 is provided with an effective diameter D2 that is larger than the effective diameter D1 of the valve seat portion 31. This provides a fluid pressure effective area on the first movable member 28 to which is applied a fluid pressure differential between the fluid pressure P1 in the inlet passage 13 and the fluid pressure P2 in the outlet passage 14 (the fluid pressure P2 being less than the fluid pressure P1) in the condition when fluid communication between the inlet passage 13 and outlet passage 14 is interrupted. A fluid pressure differential between the fluid pressures P1 and P2 that exceeds a predetermined value is capable of holding the first movable member 28 in the second position against the biasing force or spring force of the return spring 37.

In FIGS. 1 and 2, the brake master cylinder M/C is not operated so the first passage 13 is not supplied with a pressurized fluid, and the electromagnet 15 is not energized. Thus, the first and second movable members 28 and 25 are positioned in the first and non-energized positions respectively so that fluid communication between the inlet and outlet passages 13 and 14 through the first fluid chamber 16 is established while restricted fluid communication between the inlet and outlet passages 13 and 14 through the second fluid chamber 16 is interrupted.

When the brake master cylinder M/C is operated to stop the automotive vehicle, pressurized fluid supplied to the inlet passage 13 from master cylinder M/C flows to the wheel brake cylinder W/C through the first fluid chamber 16 and the outlet passage 14 thereby causing vehicle braking.

During vehicle braking, when the electromagnet 15 is energized for anti-lock control, the second movable member 25 moves from the non-energized position to the energized position while the first movable member 28 moves from the first position into the second position. Consequently, fluid communication between the inlet and outlet passages 13 and 14 is interrupted. After this, fluid pressure in the wheel brake cylinder may be reduced by discharging pressurized fluid from the wheel brake cylinder in a conventional manner.

After reducing the fluid pressure in the wheel brake cylinder W/C, when the electromagnet 15 is de-energized to increase the fluid pressure in the wheel brake cylinder W/C, the second movable member 25 is moved from the energized position to the non-energized position by the return spring 20. At the same time, the first movable member 28 is maintained in the second position by virtue of the fluid pressure differential (P1–P2) between the inlet and outlet passages 13 and 14 being larger than the predetermined fluid pressure differential.

Looking at this in more detail, the fluid pressure P1 in the inlet passage 13 acts on a portion of the first movable member 28 defined by the area $$\frac{\pi D1^2}{4},$$

which tends to urge the first movable member 28 towards the first position. In addition, the fluid pressure P1 in the passage 33 acts on a portion of the first movable member 28 defined by the area $$\frac{\pi D2^2}{4},$$

which tends to urge the first movable member 28 towards the second position and tends to urge the second movable member 25 towards the non-energized position. The fluid pressure P2 in the first chamber 16 acts on a portion of the first movable member 28 defined by the area $$\frac{\pi D3^2}{4} - \frac{\pi D1^2}{4}$$

(D3 being the outer diameter of the first movable member 28), which tends to urge the first movable member 28 towards the first position. Further, the fluid pressure P2 in the second chamber 27 acts on the portion of the first movable member 28 defined by the area $$\frac{\pi D3^2}{4} - \frac{\pi D2^2}{4},$$

which tends to urge the first movable member 28 towards the second position. Thus, the first movable member 28 is urged towards the second position by the pressure differential between the pressures P1 and P2 acting on the portion of the first movable member 28 defined by the area $$\frac{\pi D2^2}{4} - \frac{\pi D1^2}{4}.$$

This pressure differential, when it is larger than a predetermined pressure differential, holds the first movable member 28 in the second position against the return spring 37.

With the second movable member 25 in the non-energized position and the first movable member 28 being held in the second position, fluid communication between the second fluid chamber 27 and the inlet passage 13 is established so that restricted fluid communication between the inlet and outlet passages 13, 14 is established. At the same time, non-restricted fluid communication between the inlet and outlet passages 13 and 14 through the first fluid chamber 16 is still interrupted. In this condition, pressurized fluid supplied to the inlet passage 13 flows into the outlet passage 14 through the fluid passage 33, the second fluid chamber 27, the orifice 35, and the first fluid chamber 16 so that the fluid flow rate from the inlet passage 13 to the outlet passage 14 is reduced. This reduces the noise generated by fluid flow upon reestablishing the fluid flow from the inlet passage 13 to the outlet passage 14.

After this, when the electromagnet 15 is energized again to reduce or hold the fluid pressure in the wheel brake cylinder, the second movable member 25 is once again moved from the non-energized position into the energized position so that the second valve portion 29 seats on or sealingly engages the valve seat portion 30, thereby once again interrupting the restricted fluid communication between the inlet and outlet passages 13 and 14.

When the fluid pressure differential between the inlet and the outlet passages 13 and 14 falls below the predetermined fluid pressure differential by increasing the fluid pressure in the outlet passage 14 due to de-energizing of the electromagnet 15, the first movable member 28 is moved by the return spring 37 from the second position into the first position shown in FIG. 2 so that the un-restricted fluid communication between the inlet and outlet passages 13 and 14 is reestablished and the restricted fluid communication between the inlet and outlet passages 13 and 14 is interrupted.

If the brake master cylinder M/C is rapidly operated for braking the vehicle, the pressurized fluid supplied to the inlet fluid passage 13 jets into the fluid passage 33 so that the fluid pressure in the fluid passage 33 may be increased and the first movable member 28 tends to move from the first position into the second position in which fluid communication between the inlet and outlet passages 13 and 14 through the first fluid chamber 16 is interrupted. However, the movement of the first movable member 28 from the first position into the second position brings the valve seat portion 30 into a spaced apart relation with the first valve portion 29, thereby establishing the restricted fluid communication between the inlet and outlet passages 13 and 14 through the second fluid chamber 27, orifice 35 and first fluid chamber 16. Therefore, pressurized fluid is supplied to the wheel brake and then vehicle braking is achieved.

Figure 3:
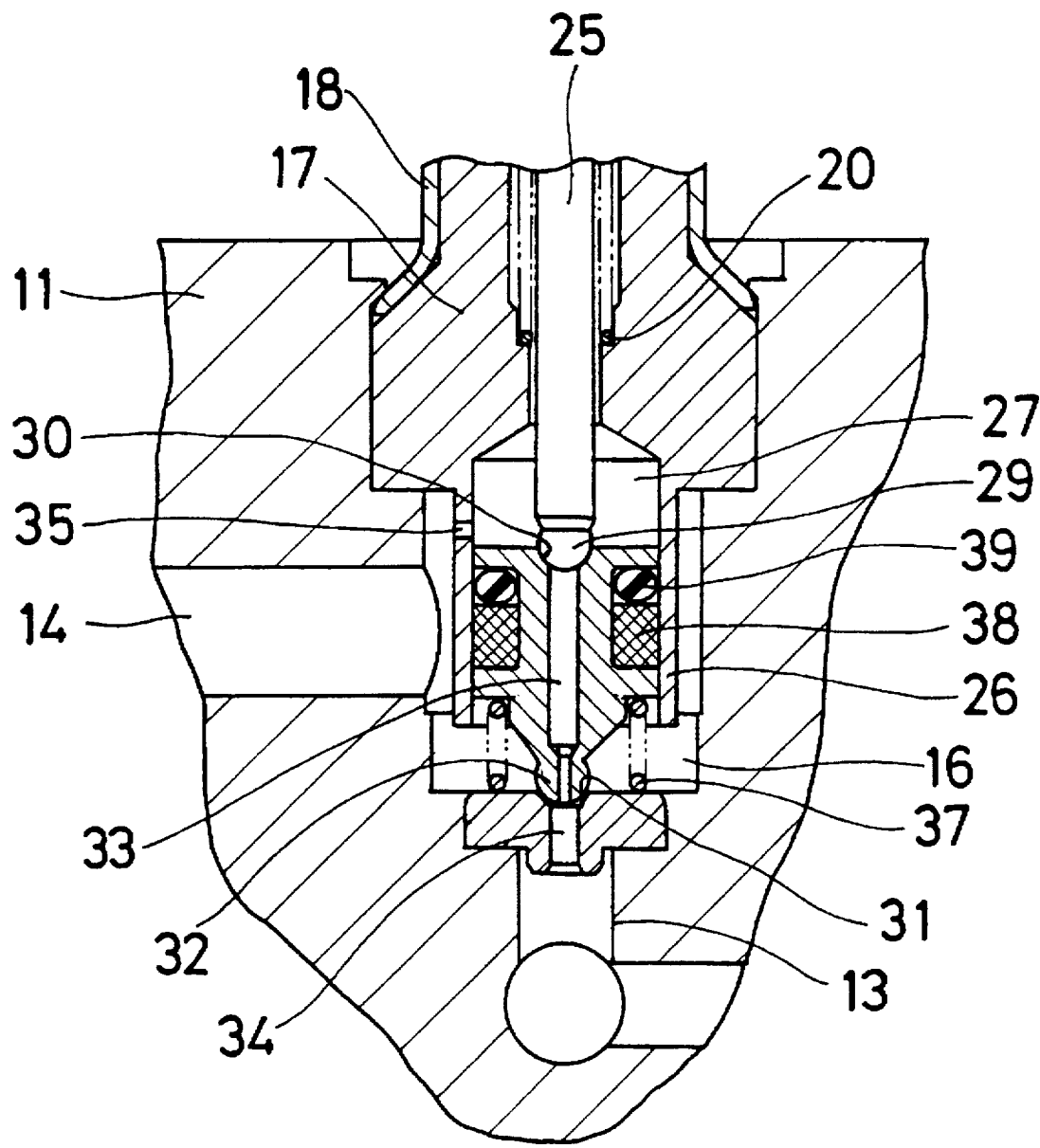
FIG. 3 is an enlarged cross-sectional view of a portion of an electromagnetic valve in accordance with a second embodiment of the present invention.

Referring to FIG. 3, there is shown a second embodiment of an electromagnetic valve device according to the present invention. The difference in this second embodiment relative to the first embodiment shown in FIGS. 1 and 2 is that the annular groove provided on the outer periphery of the first movable member 28 receives an annular sealing member 38 made of resin material. The annular sealing member 38 slidably contacts the inner periphery of the sleeve member 26. Also positioned in the annular groove in the outer periphery of the first movable member 28 is an annular sealing member 39 made of rubber material which sealingly contacts the sealing member 38 and the movable member 28. The sealing member 38 made of resin material prevents the first movable member 28 from adhering to the sleeve member 26.

Figure 4:
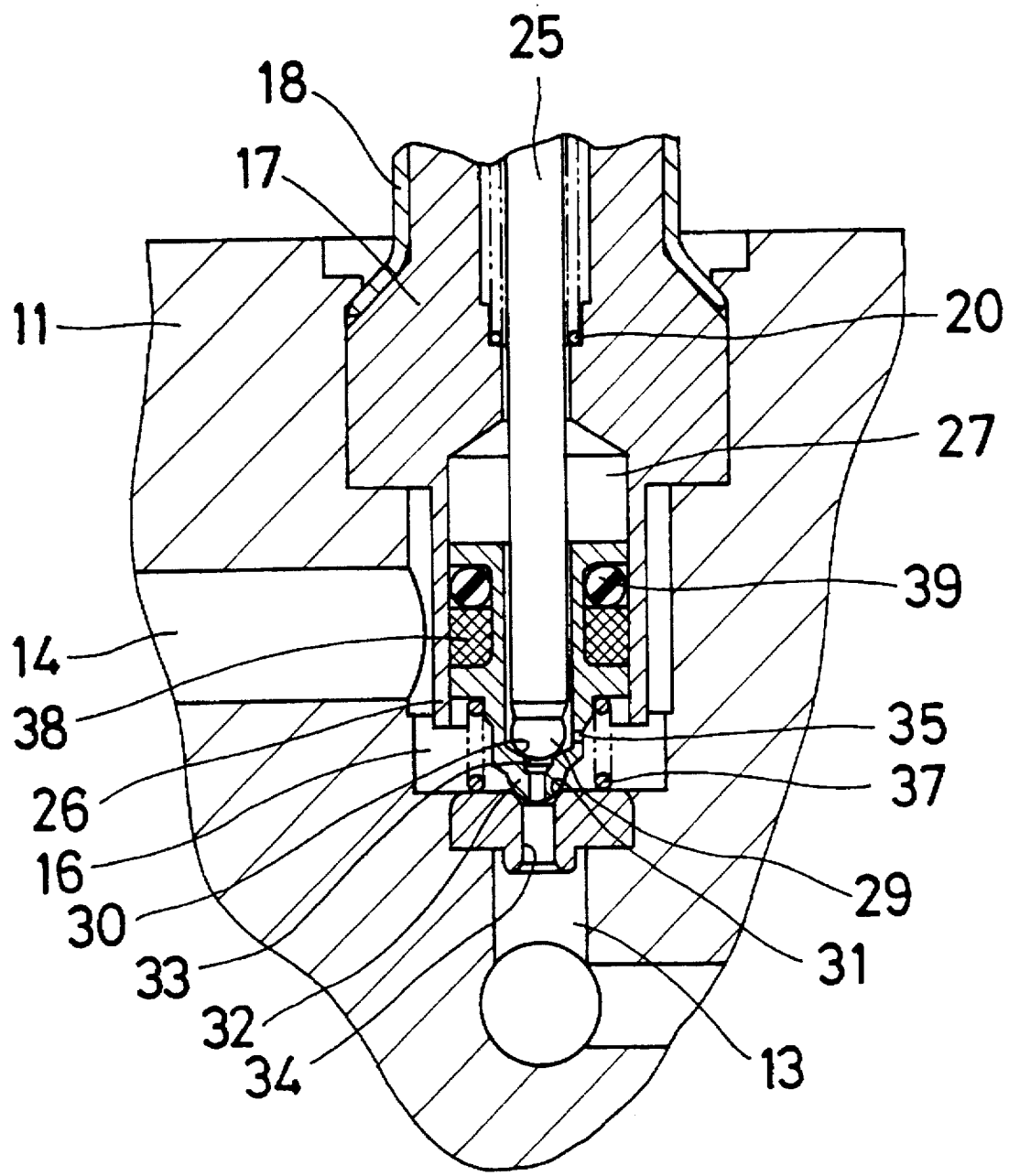
FIG. 4 is an enlarged cross-sectional view of a portion of an electromagnetic valve in accordance with a third embodiment the present invention.

With reference to FIG. 4, a third embodiment of an electromagnetic valve device according to the present invention is illustrated. The differences in this third embodiment relative to the second embodiment shown in FIG. 3 involve the valve seat portion 30 and the orifice 35. As seen in FIG. 4, the valve seat portion 30 is disposed at the bottom of a central bore provided in the first movable member 28. The orifice 35 for fluidly communicating the second fluid chamber 27 with the first fluid chamber 16 is provided in the first movable member 28.

Figure 5:
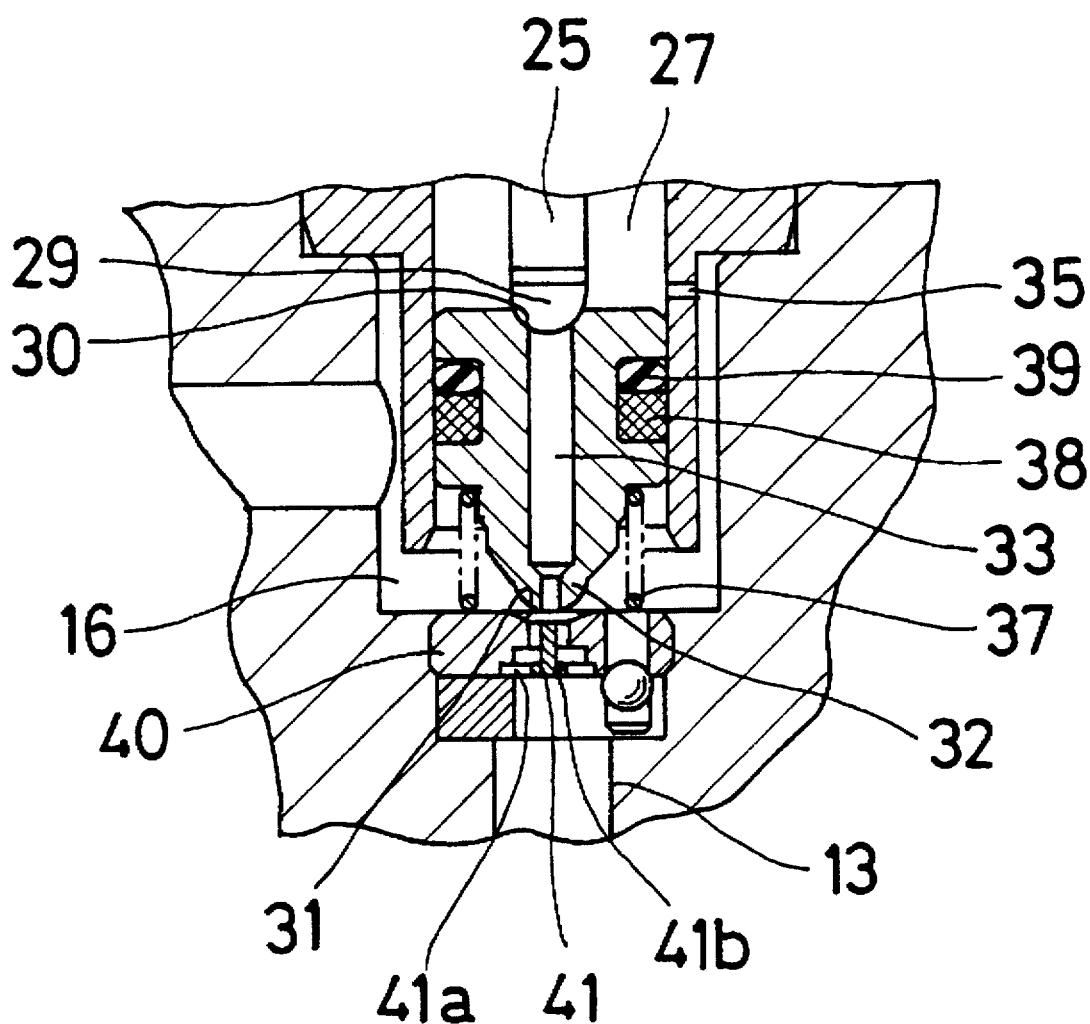
FIG. 5 is an enlarged cross-sectional view of a portion of an electromagnetic valve in accordance with a fourth embodiment of the present invention.

Referring to FIG. 5, there is shown a fourth embodiment of an electromagnetic valve device according to the present invention. The differences between this fourth embodiment and the second embodiment shown in FIG. 3 is that a deflector 41 is disposed in a fluid passage between an inlet passage 13 and a valve seat portion 31. The deflector is provided with notches 41a that act as fluid passages and a pin 41b. The deflector 41 deflect the jet of fluid flowing from the inlet passage 13 into the first fluid chamber 16 from the passage 33 provided in the first movable member 28 when the brake master cylinder is rapidly operated.

The principles, preferred embodiments, and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An electromagnetic valve device comprising:

a valve body in which is formed a first fluid chamber, an inlet fluid passage, and an outlet fluid passage, said inlet and outlet passages being in fluid communication with said first fluid chamber;

an electromagnet device fixed to said valve body;

a sleeve member positioned in said first fluid chamber and fixed to said valve body, said sleeve member having an interior;

a first movable member sealingly and slidably positioned within the interior of said sleeve member to define a second fluid chamber within said sleeve member, said first movable member having a first valve portion positioned in said first fluid chamber for selectively interrupting fluid communication between said first fluid chamber and said inlet fluid passage, a first return spring for urging said first movable member to a first position in which fluid communication between said first fluid chamber and said inlet fluid passage is established, said second fluid chamber being in continuous fluid communication with said first fluid chamber through an orifice and being in fluid communication with said inlet fluid passage through an additional fluid passage provided within said first movable member;

a second movable member operatively connected to said electromagnet device and having a second valve portion positioned in said second fluid chamber for selectively interrupting fluid communication between said second fluid chamber and said inlet fluid passage, a second return spring for urging said second movable member to a non-energized position in which fluid communication between said second fluid chamber and said inlet fluid passage is established when said first movable member is positioned in said first position, said second movable member being movable by said electromagnet device from said non-energized position to an energized position in which fluid communication between said second fluid chamber and said inlet fluid passage is interrupted, the movement of said second movable member from the non-energized position to the energized position causing said first movable member to move from said first position into a second position in which fluid communication between said first fluid chamber and said inlet fluid passage is interrupted; and means for maintaining said first movable member in said second position against a spring force of said first return spring when the second movable member moves to the non-energized position.

2. An electromagnetic valve device in accordance with claim 1, wherein said means for maintaining said first movable member in said second position against the spring force of said first return spring when the second movable member moves to the non-energized position comprises a fluid pressure effective area larger than a fluid pressure effective area of said valve member to generate a force which holds said first movable member in said second position against the spring force of said first return spring.

3. An electromagnetic valve device in accordance with claim 1, including a deflector to deflect a jet of fluid flowing from said inlet passage into said first fluid chamber.

4. An electromagnetic valve device in accordance with claim 1, wherein said first movable member includes on an outer periphery that is provided with an annular sealing member made of resin material.

5. An electromagnetic valve device in accordance with claim 1, wherein said electromagnet includes a stationary core member defining said first fluid chamber, said sleeve member and said stationary core member being formed as one piece.

6. An electromagnetic valve device in accordance with claim 1, wherein said inlet passage is adapted to be in fluid communication with a brake master cylinder, and said outlet passage is adapted to be in fluid communication with at least one wheel brake cylinder.

7. An electromagnetic valve device comprising:

a valve body provided with a first fluid chamber, an inlet passage, and an outlet passage, said inlet and outlet passages being in fluid communication with said first fluid chamber;

an electromagnet device fixed to said valve body;

a sleeve member positioned in said first fluid chamber and fixed to said valve body, said sleeve member having an interior;

a first movable member slidably positioned within the interior of said sleeve member and defining a second fluid chamber within said sleeve member, said first movable member having a first valve portion positioned in said first fluid chamber for selectively establishing and interrupting unrestricted fluid communication between said first fluid chamber and said inlet fluid passage, a first return spring for urging said first movable member in a first direction towards a first position to establish unrestricted fluid communication between said first fluid chamber and said inlet fluid passage, said second fluid chamber being in continuous fluid communication with said first fluid chamber through an orifice and being in fluid communication with said inlet fluid passage through an additional fluid passage provided within said first movable member;

a second movable member operatively connected to said electromagnet device and having a second valve portion positioned in said second chamber for selectively establishing and interrupting fluid communication between said second fluid chamber and said inlet fluid passage, a second return spring for urging said second movable member to a non-energized position in which fluid communication between said second fluid chamber and said inlet fluid passage is established through said additional passage when said first movable member is positioned in said first position, said second movable member being movable by said electromagnet device from the non-energized position to an energized position in which fluid communication between said second fluid chamber and said inlet fluid passage is interrupted, movement of said second movable member to said energized position causing said first movable member to move from said first position to a second position in which unrestricted fluid communication between said first fluid chamber and said inlet fluid passage is interrupted; and means for providing a fluid pressure force against the first movable member sufficient to maintain the first movable member in the second position when the second movable member is in the non-energized position until a pressure differential between the pressure at the outlet fluid passage and the pressure at the inlet fluid passage is less than a predetermined value.

8. An electromagnetic valve device in accordance with claim 7, including a deflector to deflect a jet of fluid flowing from said inlet passage into said first fluid chamber.

9. An electromagnetic valve device in accordance with claim 7, wherein said first movable member includes on an outer periphery that is provided with an annular sealing member made of resin material.

10. An electromagnetic valve device in accordance with claim 7, wherein said electromagnet includes a stationary core member defining said first fluid chamber, said sleeve member and said stationary core member being formed as one piece.

11. An electromagnetic valve device in accordance with claim 7, wherein said first valve portion cooperates with a first valve seat having a first diameter and said second valve portion cooperates with a second valve seat having a second diameter, said means for providing a fluid pressure force against the first movable member including the second diameter being greater than the first diameter.

* * * * *